May 1, 1951  A. LIZUN  2,550,704

FISHING LURE

Filed Jan. 23, 1948

INVENTOR.
Augustus Lizun
BY
McMorrow, Berman & Davidson
Attorneys

Patented May 1, 1951

2,550,704

UNITED STATES PATENT OFFICE 2,550,704

FISHING LURE

Augustus Lizun, Wharton, N. J.

Application January 23, 1948, Serial No. 3,979

4 Claims. (Cl. 43—42.06)

My invention relates to fishing lures, and more particularly to that type of lure which simulates a fish or an insect, whereby to attract the attention of the fish to lure the latter. With the foregoing in view, an object of my invention is to provide an improved fishing lure.

A further object of my invention is to provide an improved fishing lure which incorporates means for causing the lure to skip about the surface of a body of water with a sputtering action whereby to attract the attention of the fish, and to lure the same.

A further object is to provide an improved fishing lure of the type last described which includes means for creating the desired effect and which comprises the particular combination and arrangement of the various elements on an unconventional body of a simulated bait.

Other objects and advantages reside in the particular construction of the invention, combination and arrangement of the several parts thereof, and/or in the particular method or mode of operation, all of which will be readily apparent to those skilled in the art upon reference to the attached drawings in connection with the following specification, wherein the invention is shown, described and claimed.

Figure 1:
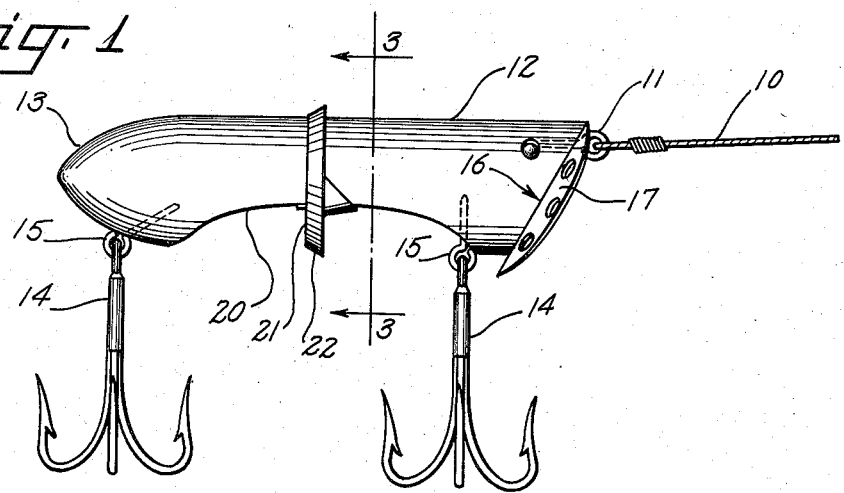
Figure 1 is an elevation of a preferred form of the invention.
Figure 2:
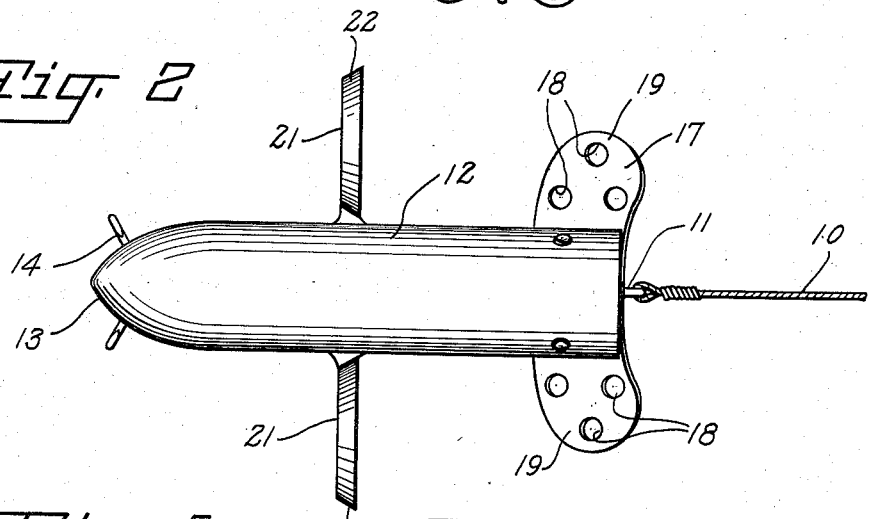
Figure 2 is a plan view thereof.
Figure 3:
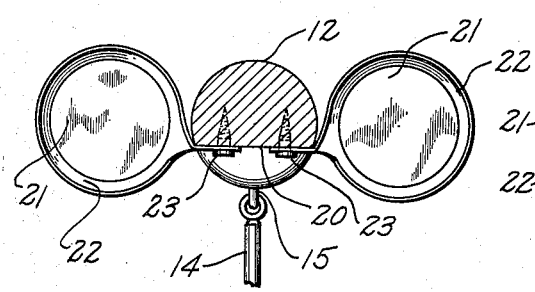
Figure 3 is a transverse vertical section taken substantially on the plane of the line 3—3 of Figure 1.
Figure 4:
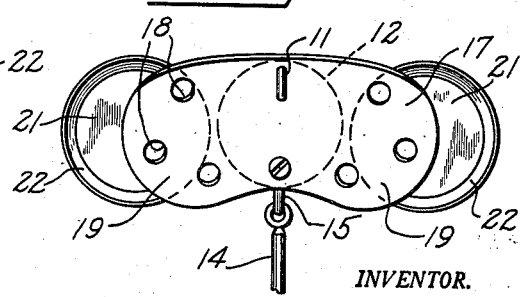
Figure 4 is a front view of the lure according to the invention.

In the drawings, wherein like reference characters have been used throughout to designate like parts, 10 designates a fishing line which is suitably attached by any suitable eye 11 to the body 12 of a fishing lure according to the invention. The fishing lure body 12 is formed to provide a substantially blunt front end and a conical rear end 13. Any suitable multiple hooks 14 are secured in any suitable manner, as by the eye screws 15, to the under side of the body 12. The hooks or their particular arrangement with respect to the body 12 comprise no part of the present invention.

The forward face of the body 12 is rearwardly and downwardly beveled, as generally indicated at 16, Figure 1, and has secured thereacross a plate member 17 which is provided with free ends or wing portions 19 which extend laterally outwardly of each side of the body 12. The free end edges of the extensions 19 are preferably rounded, and are formed to provide a plurality of apertures 18 therethrough. The plate 17 is preferably slightly concave on its forward face, which, together with the rearwardly and downwardly inclination of the plate, tends to cause the lure to rise to the surface as the same is drawn through the water. At the same time, the openings 18 therethrough permit the passage of water through the plate, which passage serves to restrict such movement of the plate toward the surface of the water whereby to cause a sputtering action as the lure is drawn ahead.

The under surface of the lure body 12 rearwardly of the plate 17 is formed to provide a longitudinally-concave recess 20. Such recess 20 is substantially semi-cylindrical in shape and is operative to present opposed front and rear downwardly-inclined surfaces, whereby to cause the lure to tend to dive. Thus, the diving action created by the recess 20 cooperates with the apertures 18 in the plate 17 to retard the upward movement which is instigated by the downwardly and rearwardly inclined surfaces of the plate 17.

The body 12 is provided midway of its length and on either side thereof with a pair of laterally oppositely-directed shells 21. The shells 21 are substantially circular in shape and extend from the body 12 at an angle normal to the same. The shells 21 are secured to the body in any suitable manner, as by the fastening means 23 which secure the same to the body at the apex of the concave recess 20. Each of the shells 21 is formed to provide a forwardly-directed and substantially frusto-conical flange 22 therearound, whereby to cause said shells to be substantially cup-shaped. This cup-shaped arrangement of the shells 21 provides receptacles to catch any jets issuing through the holes 18 of the plate 17. In this connection, it is noted that the shells 21 are longitudinally aligned with at least some of the openings 18 and are in rearwardly-spaced relation thereto. Thus, as any jet from the openings 18 impinges against the shells 21, they are deflected radially outwardly by the frusto-conical flanges 22, whereby to retard movement of the lure through the water. This retardation of the lure passage accentuates the sputtering action and creates quite a disturbance as the lure is drawn through the water, whereby to attract the attention of any fish intended to be lured.

It follows from the foregoing that the particular lure according to the invention relies for its fish-attracting properties upon the particular arrangement of the plate 17, the holes 18 therethrough, the concave recess 20 in the under surface of the lure and the shells 21 which extend laterally therefrom and which are provided with the frusto-conical flanges 22.

While I have shown and described what is now thought to be a preferred embodiment of the invention, it is to be understood that the same is susceptible of other forms and expressions. Consequently, I do not limit myself to the precise structure shown and described, except as hereinafter claimed.

I claim:

1. A fish lure, comprising a substantially cylindrical body, a forwardly-inclined plate secured across the front end of said body, said plate including wing portions extending laterally of both sides of said body, said wings being each formed to provide a plurality of spaced apertures therethrough, and a pair of shells carried by said body rearwardly of said plate, said shells extending laterally from each side of said body substantially at right angles thereto and in spaced alignment with a wing adjacent thereto.

2. A fish lure, comprising a substantially cylindrical body, a forwardly-inclined plate secured across the front end of said body, said plate including wing portions extending laterally of both sides of said body, said wings being formed to provide apertures therethrough, and a pair of shells carried by said body rearwardly of said plate, there being a shell extending laterally from each side of said body substantially at right angles thereto, and said shells being formed with forwardly-directed marginal flanges.

3. A fish lure, comprising a substantially cylindrical body, a forwardly-inclined plate secured across the front end of said body, said plate including wing portions extending laterally of both sides of said body, said wings being formed to provide apertures therethrough, and a pair of shells carried by said body rearwardly of said plate, there being a shell extending laterally from each side of said body substantially at right angles thereto, said shells being substantially circular, said shells being formed with annular frusto-conically outwardly-directed marginal flanges therearound, and said flanges being forwardly directed.

4. A fish lure, comprising a substantially cylindrical body, a forwardly-inclined plate secured across the front end of said body, said plate including wing portions extending laterally of both sides of said body, said wings being formed to provide apertures therethrough, and a pair of shells carried by said body rearwardly of said plate, there being a shell extending laterally from each side of said body substantially at right angles thereto, said body being formed with a longitudinally-concave recess in the under surface thereof in rearwardly-spaced relation to said plate, and said shells lying in a vertical plane substantially bisecting said recess transversely.

AUGUSTUS LIZUN.

REFERENCES CITED

The following references are of record in the file of this patent:

UNITED STATES PATENTS

| Number | Name | Date |
| --- | --- | --- |
| 956,872 | Alger | May 3, 1910 |
| 1,193,077 | Schoonmaker | Aug. 1, 1916 |
| 1,627,455 | Peterson | May 3, 1927 |
| 2,155,294 | Barnett | Apr. 18, 1939 |
| 2,387,255 | Godlewski | Oct. 23, 1945 |
| 2,450,253 | Parnell | Sept. 28, 1948 |

FOREIGN PATENTS

| Number | Country | Date |
| --- | --- | --- |
| 277,483 | Great Britain | Sept. 22, 1927 |